March 5, 1929.  W. N. BAKER ET AL  1,704,356
PHOTOGRAPHIC LINE PRINTING
Filed Feb. 23, 1928

Inventors
Walter N. Baker
and Arthur R. Baker
By Thomas H. Ferguson
Attorney

Patented Mar. 5, 1929.

1,704,356

UNITED STATES PATENT OFFICE.

WALTER N. BAKER AND ARTHUR R. BAKER, OF CHICAGO, ILLINOIS.

PHOTOGRAPHIC LINE PRINTING.

Application filed February 23, 1928. Serial No. 256,107.

The present invention relates to photographic line printing and has for its object to produce a novel sensitized sheet or strip of cloth, paper or like material, for print purposes, which may be exposed and developed like ordinary blue print paper but which will have desirable characteristics not possessed by the blue print paper or other prior known photographic print papers. The print resulting from the exposure and development of our product is a clean, sharp and durable pigment print of genuine commercial value.

One of the new characteristics of our novel product is the color. The product may be made up in different colors, and whatever the color of the finished product before exposure such will be the color of the print after exposure and development. In other words, those portions of the light-sensitive coating which are fixed by the chemical action of the light or other actinic ray source will retain the color of the original product. Another characteristic is the sharpness and clearness of the lines and dots of the print which go to make up the representation printed. Different pigments are employed to give the colors and these are held by the coating of the sheet so as to give sharp and clean lines after exposure and development. As usual, the portions of the coating which have not been chemically acted upon are dissolved and removed by the development. For developing we use cold water. By its use all the pigmented coating between the lines and dots is dissolved and carried away, leaving a clean, neat and distinct print.

The invention is limited to line work; that is, to printing where the object printed is shown by lines or dots or both. Such will include printing from photographic negatives and positives where a half-tone cross line screen is used, the screen breaking up the various surfaces into minute dots. These dots can be seen only through a magnifying glass, and without the latter the surfaces appear continuous and unbroken. Our product will provide good prints wherever lines and dots depict the object or configuration to be shown in the print, but it is not intended to be used to produce continuous tone prints, such as regular photographs or wash drawings.

For a fuller understanding of the invention, reference should be had to the accompanying drawing and the following detailed description wherein the preferred form of the invention is shown and described at length. For the scope of the invention attention is directed to the appended claims.

Figure 1:
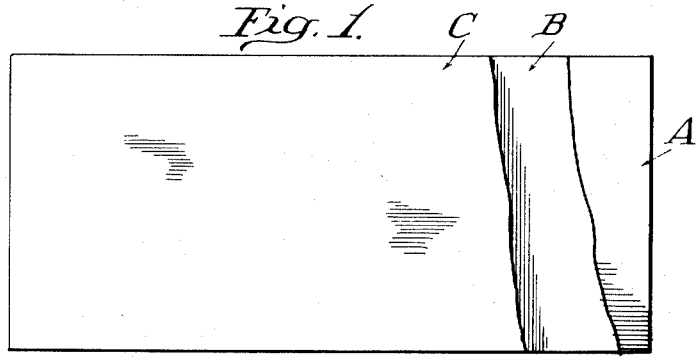
Figure 2:
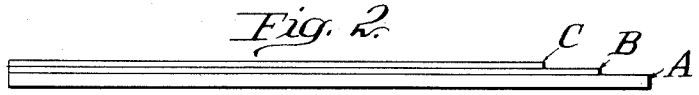
Figure 3:
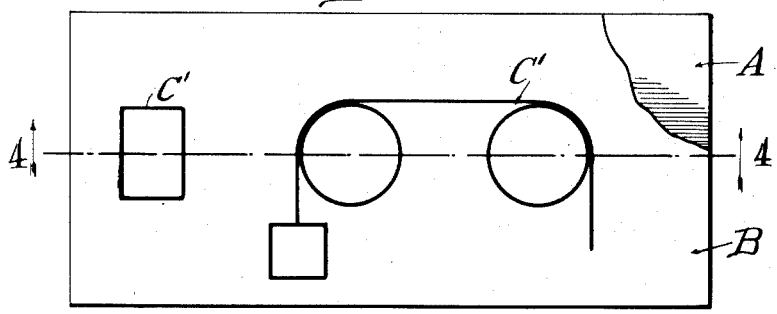
Figure 4:
Figure 5:
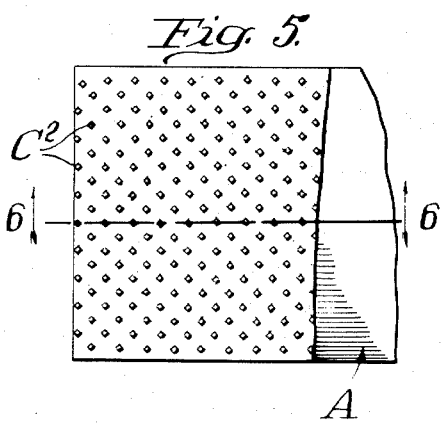
Figure 6:

Referring to said drawing, Fig. 1 is a plan view of a sheet constituting our new product, portions of the coatings being removed to show the base and coatings of the sheet; Fig. 2 is a side elevation of the same, also showing portions of the coatings removed; Fig. 3 is a plan view of a developed sheet; Fig. 4 is a vertical section of said developed sheet, the plane of section being indicated by the line 4—4 of Fig. 3; Fig. 5 is a plan view of an additional sheet, magnified to show the dots produced upon a smooth surface by a screen; and Fig. 6 is a section of the same taken on a plane indicated by the line 6—6 of Fig. 5. Throughout these views like characters refer to like parts. In all the views the parts are drawn to a large scale in order to make the structure clear, Figs. 5 and 6 being considerably more enlarged than the other figures in order to represent the parts as seen through a magnifying glass.

In producing our new product we employ a base A of flexible material and upon this we place a first coating B, and upon the latter when it dries a second coating C. The finished merchantable sheet or strip is a product having this base and these coatings. The light-sensitive coating is the coating C. When exposed to the chemical action of actinic rays derived from sun light or other suitable source, and when developed by washing with cold water, all of the coating C, except that so chemically affected, is dissolved and washed away, leaving the portions $C^1$, $C^2$, which constitute the lines and dots of the print. These lines and dots, or either of them, provide the representation of the drawing or picture printed. In Figs. 5 and 6 a group of dots $C^2$ is shown upon a much enlarged scale in order to make clear how a continuous surface may be broken up into dots by the use of a screen in connection with an ordinary photographic negative. These views are intended to show how such a broken up surface appears when viewed through a magnifying glass. The use of negatives and screens for the purpose of breaking up continuous surfaces in this way is well known in the art to which our invention relates. Where a line negative or positive is used, it is of course unnecessary to use a screen, and in such case our novel sheet or strip will show when developed, lines instead of dots, whether the print be examined by the use of a magnifying glass or not. In lieu of photographic negatives, positives and screens, we may employ many other means as light controlling or print controlling elements, such as original line drawings, tracings, proofs of line or type matter, or indeed any line medium that will give results as line work.

The base A of the product is ordinarily paper or cloth, and usually when the latter, ordinary tracing cloth. The coating B is composed of collodion, lacquer, or a compound of collodion and lacquer. There are many compounds of collodions and lacquer of different kinds and these are to be included as suitable for the first coating B. Where paper is used as the base A, we employ, for the coating B, collodion or lacquer or a compound of the two. Thus a plain pyroxyline collodion or a pyroxyline or cellulose lacquer will do on paper. The lacquers are waterproofing substances but there is no objection to the paper being waterproofed although it is not necessary to have it so. But where tracing cloth forms the base A, then some waterproofing substance such as lacquer must be used. Collodion alone will not do. As to the compounds of collodion and lacquer, some will serve upon tracing cloth and others will not, the test being whether or not the cloth will be suitably waterproofed. It may be pointed out that unless the tracing cloth, which is linen impregnated with starch, is waterproofed, the development of the print by washing it in water will permit the water to get into the texture of the cloth and dissolve it and leave it limp, shapeless and practically useless.

The coating B, no matter which of these substances may be used in its composition, enters into pores of the paper and into interstices among the fibres of the cloth and provides a smooth surface upon which the coating C may be spread. The intermediate coating B serves as a barrier between the coating C and the base A. If the coating B were omitted, then the materials of the coating C would enter the pores and interstices of the base A and could not be fully washed out between the lines at the time of developing the print. The result would be that the print would be cloudy and the lines not clean cut and distinct. In contrast to this, the presence of the smooth surface of the coating B next to the coating A enables the pigment and other ingredients of the coating C to be washed off of the coating B at those points where it should be, leaving the balance of the lines and dots of the coating C clear and sharp in the finished print. The coating B is therefore of considerable importance as a factor contributing to the success of our new product. It serves as a base or substratum upon which the pigment carrying coating C is located. Where the latter is chemically acted upon by the actinic rays, it remains firmly seated upon and, as it were, rooted into the coating B, and where it has not been so acted upon it may be readily dissolved and washed out by the use of the cold water. Thus, a clean cut and clear print is provided. Without the employment of coating B, it would be impossible to get a good product. In other words, by placing coating C directly upon the base A, it would be impossible to obtain a clear and unclouded print. We have determined this by experiment.

The coating C consists essentially of water, glue, a pigment, and a light-sensitive bichromate. We have found that good results are obtained if these ingredients are used in the following proportions, namely, water 28 to 35 ounces, glue 5 to 9 ounces, bichromate 375 to 425 grains, and pigment 1 to 5 ounces. The glue is preferably photo-engraving glue for process work, but other glues may be used. There is at present a glue called "Beka" glue, made in Germany, which gives satisfactory results. It is desirable, however, that the glue which is used does not approach the gelatines; that is to say, more satisfactory results are obtained when the glue employed is that which is farthest from the gelatine end of the gelatine-glue scale. Le Page's glue for process work is quite satisfactory. The same is true of Roger's photo-engraving glue. The glue serves an important function in the coating C. Its character is such that it will hold firmly to the coating B and when the print is being developed and the unfixed portion of the coating C being removed, the fixed portion will not be broken down during the washing operation. At such times wet cotton is usually employed to assist the development and then, notwithstanding its use, the fixed portions $C^1$ and $C^2$ of the coating firmly hold to the substratum B with the result that the lines and dots of the print are clear and distinct. This would not be the case if gums such as are used in the gum bichromate processes were used in our compound. If so used, the usual treatment would cause the gums to break down and satisfactory prints could not be produced. The glue on the other hand gives a good commercial line which enables the prints to be handled in a commercial way without injury. Commercially the product has to be handled quickly and in quantities. Gum does not have the requisite body or tenacity, but glue has. The light-sensitive element may be limited to ammonium bichromate, 375 to 425 grains, but we preferably add thereto 75 to 100 grains of potassium bichromate. The effect of the former is to speed up the sensitivity of the product while that of the latter is to slow it down. Ordinarily, potassium bichromate alone would produce an effect which would be too slow. These bichromates when dry are responsive to the actinic rays of light and other sources, whether luminous or non-luminous, and are commonly employed in the photographic art for printing purposes. Such bichomates provide the advantage that the print may be developed by water instead of by the use of chemicals, as is necessary where silver salts are employed as the light-sensitive ingredients.

The pigment that is incorporated in the composition may be black or colored. Its use is to give color and density to the print. The amount used may be varied according to the result desired. Thus, if an intensely black print is wanted, lamp black of considerable quantity is used, whereas if a gray print is wanted lamp black of a less amount is incorporated. Ordinarily, 5 to 9 ounces of the pigment are sufficient to agree with the quantities previously mentioned for the other ingredients. As noted, for a black color, lamp black may be used. Ivory black may also be used to give a black print. For blue, cobalt blue pigment or ultra-marine blue pigment may be used. For a red color a Venetian red pigment, for brown a sepia or brown umber pigment. Other suitable pigments are burnt umber, Paris blue, dark burnt ochre and cassel brown. Also white china clay and baryta white may be used to give a white print on a black background. In such case a black paper or cloth forms the base A. It is coated with coatings B and C, but the latter has the white pigment instead of black or colored pigments. Generally speaking, colors other than black and brown require a larger proportion of pigment to produce the stronger colors. The pigment in combination with the glue and bichromate provides a composition which is very satisfactory for line work. Wherever the compound has been acted upon by actinic rays, it becomes fixed and when the unfixed portion of the coating is dissolved and washed away, the fixed portion remains in the form of sharp and well defined lines and dots. The composition is such that it breaks off abruptly, as it were, so as to give pronounced and distinctive sharpness and smoothness to the lines and dots of the print. The employment of glue has much to do with the obtaining of this result. It can not be provided by gelatines. They will not give the same hard and smooth edges to the lines so essential to line work. This sharpness of the lines may be increased by the use of a small amount of white china clay. With the other proportions given we commonly add ¼ to ½ ounce of china clay. It must be understood that this addition of china clay is not necessary to the practice of our invention, but it improves the sharpness and to some extent the hardness of the lines and is therefore a desirable constituent of the coating C. We also preferably add a small amount of ammonium hydroxide. The purpose of this ingredient is to preserve the compound. Ordinarily, 10 to 20 minims, or drops, are sufficient. This hydroxide, however, may be omitted without affecting in any way the production of good prints. Its function is merely as a preserver. The product, when it is employed, will last longer without deterioration.

To recapitulate, the ingredients of coating C are as follows:

Glue_____ 5 to 9 ounces.
Water_____ 28 to 35 ounces.
Ammonium bichromate__ 375 to 425 grains.
Potassium bichromate___ 75 to 100 grains.
Ammonium hydroxide__ 10 to 20 drops.
China clay_____ ¼ to ½ ounce.
Pigment_____ 1 to 5 ounces.

As previously indicated, the essential ingredients are glue, water, bichromate and pigment. There may be a choice between ammonium bichromate and potassium bichromate, depending on the speed desired. The china clay may be omitted if the prints obtainable are sufficiently distinct and hard without its use. And the ammonium hydroxide may also be omitted where the product is not to be preserved for any length of time before use. Likewise, the proportions are only approximate, and there may be considerable variation in the relative proportions of the ingredients, depending quite largely on what the user desires in the ultimate product. The user may be guided in judgment by what has been said before about the character of the different ingredients and their effects upon the coating as a whole. Thus, by varying the constituents there can be obtained a thinner or thicker solution, a solution faster or slower in responding to the actinic rays, a fainter or stronger color in the product and print, etc., etc. The ingredients of coating C may be mixed in any desired order. Of course the bichromate crystals will have to be dissolved either in the water of the compound or in water beforehand. We have ordinarily first mixed the glue and water, then added the bichromate, and afterward the pigment but this order may be changed if desired. It is cited merely as illustrative of one way of mixing the compound.

What we claim as new and desire to secure by Letters Patent of the United States is:

1. A flexible sensitized photographic line print sheet or strip comprising a flexible base material; a coating thereon consisting of a material selected from a group consisting of collodion, lacquer and compounds of collodion and lacquer; and a second coating on the first coating, said second coating being composed of the following ingredients in approximately the following proportions, namely, water 28 to 35 ounces, glue 5 to 9 ounces, a pigment 1 to 5 ounces, and a light-sensitive bichromate 375 to 525 grains.

2. A flexible sensitized photographic line print sheet or strip comprising a flexible base material; a coating thereon consisting of a material selected from a group consisting of collodion, lacquer and compounds of collodion and lacquer; and a second coating on the first coating, said second coating being composed of the following ingredients in approximately the following proportions, namely, water 28 to 35 ounces, glue 5 to 9 ounces, a pigment 1 to 5 ounces, ammonium bichromate 375 to 425 grains, and potassium bichromate 75 to 100 grains.

3. A flexible sensitized photographic line print sheet or strip comprising a flexible base material; a coating thereon consisting of a material selected from a group consisting of collodion, lacquer and compounds of collodion and lacquer; and a second coating on the first coating, said second coating being composed of the following ingredients in approximately the following proportions, namely, water 28 to 35 ounces, glue 5 to 9 ounces, a pigment 1 to 5 ounces, a light-sensitive bichromate 375 to 525 grains, and white china clay ¼ to ½ ounce.

4. A flexible sensitized photographic line print sheet or strip comprising a flexible base material; a coating thereon consisting of a material selected from a group consisting of collodion, lacquer and compounds of collodion and lacquer; and a second coating on the first coating, said second coating being composed of the following ingredients in approximately the following proportions, namely, water 28 to 35 ounces, glue 5 to 9 ounces, a pigment 1 to 5 ounces, ammonium bichromate 375 to 425 grains, potassium bichromate 75 to 100 grains, and white china clay ¼ to ½ ounce.

5. A flexible sensitized photographic line print sheet or strip comprising a flexible base material; a coating thereon consisting of a material selected from a group consisting of collodion, lacquer and compounds of collodion and lacquer; and a second coating on the first coating, said second coating being composed of the following ingredients in approximately the following proportions, namely, water 28 to 35 ounces, glue 5 to 9 ounces, a pigment 1 to 5 ounces, ammonium bichromate 375 to 425 grains, potassium bichromate 75 to 100 grains, and ammonium hydroxide 10 to 20 drops.

6. A flexible sensitized photographic line print sheet or strip comprising a flexible base material; a coating thereon consisting of a material selected from a group consisting of collodion, lacquer and compounds of collodion and lacquer; and a second coating on the first coating, said second coating being composed of the following ingredients in approximately the following proportions, namely, water 28 to 35 ounces, glue 5 to 9 ounces, a pigment 1 to 5 ounces, ammonium bichromate 375 to 425 grains, potassium bichromate 75 to 100 grains, ammonium hydroxide 10 to 20 drops, and white china clay ¼ to ½ ounce.

In witness whereof, we have hereunto affixed our signatures this 18 day of Feb., 1928.

WALTER N. BAKER.
ARTHUR R. BAKER.